(No Model.) 2 Sheets—Sheet 1.

J. LANE.
VEHICLE WHEEL.

No. 278,438. Patented May 29, 1883.

WITNESSES:
Geo. C. Wilson
E. L. Lane

INVENTOR
John Lane.

(No Model.) 2 Sheets—Sheet 2.

J. LANE.
VEHICLE WHEEL.

No. 278,438. Patented May 29, 1883.

WITNESSES:
Geo. C. Wilson
E. L. Lane.

INVENTOR
John Lane.

UNITED STATES PATENT OFFICE.

JOHN LANE, OF HYDE PARK, ILLINOIS.

VEHICLE-WHEEL.

SPECIFICATION forming part of Letters Patent No. 278,438, dated May 29, 1883.

Application filed February 19, 1883. (No model.)

*To all whom it may concern:*

Be it known that I, JOHN LANE, of Hyde Park, county of Cook, and State of Illinois, have invented certain Improvements in Vehicle-Wheels, of which the following is a specification.

The object of my invention is to provide a spoked metallic wheel for sulky-plows, cultivators, &c., which shall be at once light, cheap, durable, and strong, and which may be cheaply, quickly, and easily repaired, and specially provide for a changing of the box, as the box shall become worn, by the placing of a new one with light expense and without sending the wheel to a shop.

The invention consists in certain improvements in the construction of the hub, the spokes, and the felly tire or rim, which will first be described in the specification, and afterward pointed out in the claims.

Figure 1:
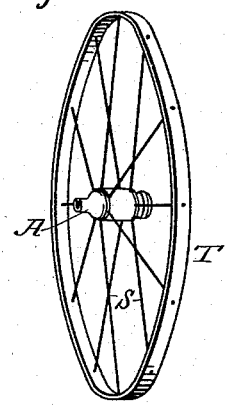
Figure 2:
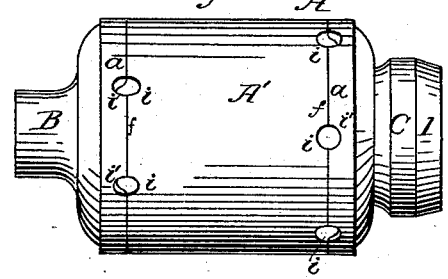
Figure 6:
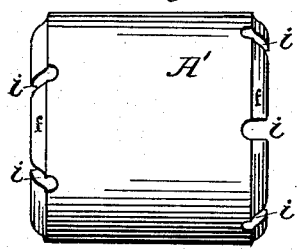
Figure 3:
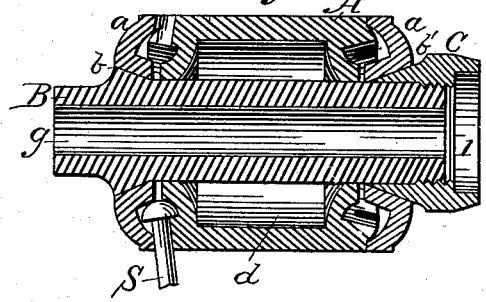
Figure 7:
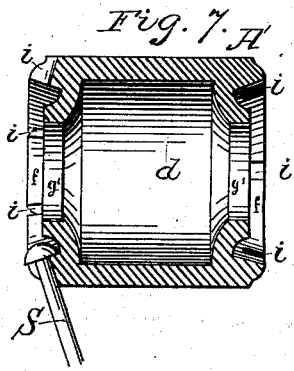
Figure 4:
Figure 5:
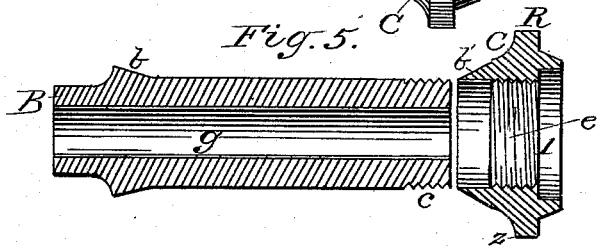
Figure 8:
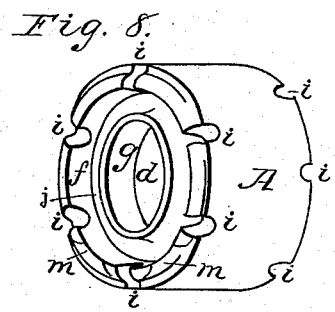
Figure 9:
Figure 10:
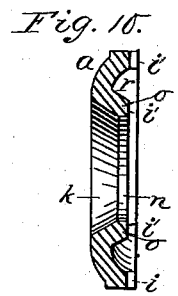
Figure 11:
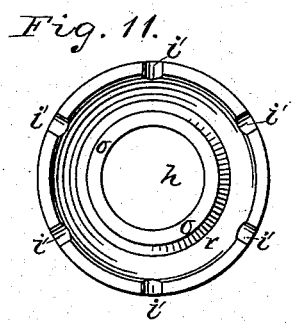
Figure 12:
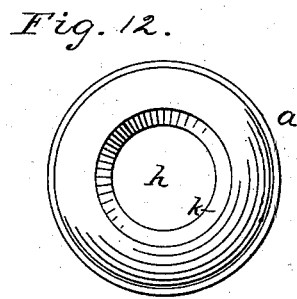
Figure 14:
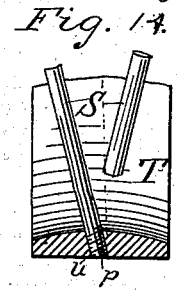
Figure 15:
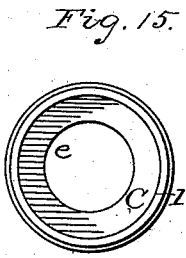
Figure 16:
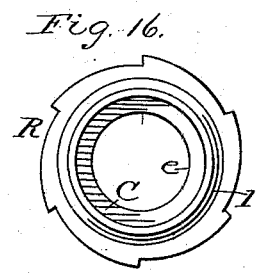
Figure 13:
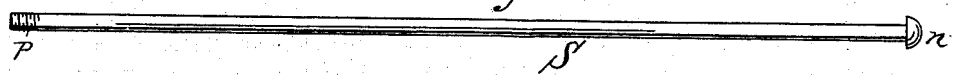

Referring to the drawings, like letters refer to like parts, Figure 1 represents a reduced perspective view of a wheel in which my improvements are embodied. Fig. 2 is a side view of the hub A. Fig. 3 is a vertical central section view taken on a line longitudinal through the center of the hub, showing all the parts composing the hub, how they are arranged relative to each other, and how the spokes are seated in the annular, also showing how the annular A', with the collars $a$ $a'$, are firmly secured together by means of the pipe-box B and the nut C. Fig. 4 is a side view of the pipe-box B with the nut C, showing how the box has a shoulder, $b$, near its outer end, and how the nut C has an annulet shoulder, $b'$. Fig. 5 is a cross-section view taken on a line longitudinal through the center of the pipe-box B, and the same view of the nut C, the latter removed from the box, showing how the pipe-box is screw-threaded at $c$ and how the nut C is screw-threaded at $e$. Fig. 6 is a side view of the annular A'; Fig. 7, a cross-section view taken on a line longitudinal through the center of the annular A', showing how its interior may be constructed with a chambered part, $d$, how the annular has upon both its ends a projecting rim, $f f'$; that the said rim is slotted with slots $i$, and the spokes are seated therein. Fig. 8 is a perspective view of the annular A', showing the recess $j$, rim $f$, and how the slots $i$ are arranged in the rim. Fig. 9 is a side view of the collar $a$, showing the slots $i'$. Fig. 10 is a cross-section view of the collar $a$, showing how it is recessed with recess $r$, and how it has an inclined seat, $k$. Fig. 11 is a view of the inner end of the collar $a$, showing the recess $r$, slots $i'$, and the central opening, $h$. Fig. 12 is a view of the outer end of the collar $a$, showing the inclined seat $k$. Fig. 13 is a view of the spoke S, having a head, $n$, upon one end and a screw upon the other end. Fig. 14 is a cross-section view of the felly tire or rim T, showing how the spokes are set and screwed into the rim. Fig. 15 is an end view of the nut C; and Fig. 16 is a view of the nut C, showing the ratchet R and the sand-cap $l$, both made solid with the nut.

In the drawings, A represents the hub of the wheel, S the spokes, and T the felly tire or rim.

The felly-tire may be constructed of half-oval iron or steel, obviating the necessity of a separate felly and tire, and perforated with screw-threaded holes, as usual and well-known. I preferably perforate the felly-tire with screw-threaded holes $u$ at one side of the center of the felly-tire, as shown in Fig. 14, one-half of the holes upon each side of the center of the felly-tire, and in the direction of the spoke to be set therein, whereby greater strength of the wheel is attained than when set in a line center of the felly-tire.

The spokes S may be of round rod iron or steel, with a screw-threaded end for entering the perforations in the felly-tire, as usual. At the hub end of the spoke I construct a round head, $n$, on the round rod-spoke S, permitting the spoke to be turned screwing into the felly-tire, after the said head is seated in the annular, and the spoke embraced by the collar.

The hub consists of the annular A', with the two collars $a$ $a'$, and the pipe-box B, with nut C.

The annular A' is constructed with a projecting rim, $f$, on both its ends, and as both ends of the annular are constructed alike, a description of one will suffice for both. The rim $f$ is slotted with slots $i$, which embrace the spokes. These slots $i$ alternate upon each end of the annular, so that the spokes upon one end fall between those upon the other end, zigzag about the annular. A recess, j, is constructed under the rim f, and extending back beyond the slots i, to provide room and seat for seating the spoke-head n, as shown in Figs. 7 and 8. The annular has a central opening, g', to admit the pipe-box B, and d represents that the annular may be chambered or cored out in order to render the hub as light as possible. It will be noticed that the inside of the rim f projects beyond the outside, so that the spoke-heads may have a large bearing beyond the body of the spoke, while the joining of the collar a with the annular may be on the line of the spoke-centers. The rim f may be broken or partially cut away between the spoke-head seats, to reduce the weight of the casting, as shown at m in Fig. 8. The collar a may be a disk-ring, covering the end of the annular A', having a central opening, h, to admit the pipe-box B. The two collars a a' are constructed alike, and a description of one will suffice for both. The collar a is provided with a recess, r, to admit the rim f and slots i' to embrace and support the spoke S, as shown in the drawings. The center opening, h, has the seat k made inclined and fitting the inclined shoulder b on the pipe-box. The collar a may have an annular extension or shoulder, o, forming a bearing against and supporting the end of the head n of the spoke S, whereby the head n will be supported and prevented from being forced away from the rim f. Bolts t may be used to secure and hold the collars to the end of the annular, as shown in Fig. 2. The bearing or shoulder o and the bolts t may be dispensed with without departing from my invention.

The sulky-plow wheel is subjected to strain, crowding, and twisting as it revolves, and the pipe-box B is that part of the hub most subject to wear by the gritty soil getting interior on the axle-journal and exterior about the annular and collars, causing rapid wear on the exterior of the box and about its bearings on the annular and collars. It is to obviate and overcome this that I have improved the box and its bearings, as will now be shown.

The pipe-box B is a cylindrical pipe open at both ends, provided near its outer end with a shoulder, b, which shoulder I preferably make inclined, and which is seated in the central opening, h, of the collar a on the seat k, and the other end of the pipe-box B is screw-threaded, at c, to receive the nut C. The extended end q of the pipe-box B, extending outwardly from the shoulder b, is reduced in size externally, so that the sand-cap nut in common use may be used therewith. The nut C is screw-threaded, at e, as shown, and preferably made with an annulet shoulder, b', which shoulder is inclined to fit the bearing k in the collar a. When the nut C is screwed upon the pipe it will bring the shoulders b b' into the seats or bearings k k, and securely hold the annular and the two collars together, and when any looseness by wear occurs about the shoulders the nut may be tightened, driving the shoulders b b' into the opening h h on the seat k, taking up the slack. The inclines on the shoulders b b' may be more or less inclined. I prefer that shown in the drawings. I do not limit myself to such inclined shoulders, as they may be dispensed with and square shoulders substituted, and still remain within the purview of my invention when combined and used with the annular A' and collars a a'. The nut C may have the usual sand-cap, l, and the ratchet R may be made solid therewith, as shown in Fig. 5. The sand-cap made solid with the nut C is not my invention; but in the combination therewith of the ratchet R made solid together I do claim novelty. The ratchet R is used to provide for the use of a power-lift in sulky-plows.

To assemble the wheel, the spokes are inserted in the rim T and seated in the annular. The collars are then placed over the ends of the annular. The pipe-box is then inserted and the nut run on the box, all loosely at first. Then, with a suitable wrench for turning round rods, the spokes are turned, screwing into the felly tire or rim T, bringing the heads n firmly into seat and putting tension on the spokes, suspending the hub to the felly tire or rim in all directions of the spokes, after which the nut C is turned, bringing the shoulders b b' firmly into seat, and the collars a a' embracing snugly against the annular, in which Fig. 2 represents the so-completed hub, and Fig. 1 the completed wheel.

It is to be noted that in my improved wheel the spokes are intended and are arranged to receive a tensile instead of a thrusting strain, and that the construction of the entire wheel is shaped to this end.

I am aware that metallic wheels and sectional metallic hubs have been made in many forms, and that spokes have been secured to hubs by means of collars applied thereto; but I am not aware that any one has hitherto constructed a hub or wheel in the peculiar manner represented in the accompanying drawings.

I am also aware that trussed wheels, or wheels in which small spokes of wire having a tensile strain, have been constructed, and such I do not broadly claim.

The whole construction of my wheel is simple, light, inexpensive, and strong, and each part thereof may be made in duplication and interchangeable, and new parts substituted for worn ones, with light expense and without sending the wheel to a shop.

Having described my invention, what I claim as new, and desire to secure by Letters Patent, is—

1. In a metallic wheel, the combination of the felly-tire composed of a single bar perforated with oblique screw-threaded holes, spokes provided with heads and screw-threaded ends, as shown, and the screw-threaded ends screwed into the screw-threaded perforations in the felly-tire, the annular with the said heads of the spokes seated alternately in either end of the annular, and the spokes standing zigzag about the annular, substantially as and for the purpose set forth.

2. In a metallic wheel, the combination of the spokes S, constructed of round iron or steel, provided with round heads $n$ and screw-threaded ends $p$, the annular provided with a rim, sole supporting the said heads, the collars embracing and supporting the body of the said spokes, the felly-tire composed of a single bar provided with screw-threaded perforations, and the said spokes screwed directly into the said perforations, all substantially as and for the purpose set forth.

3. In a metallic wheel, the annular A', provided with the rim $f$, projecting beyond the body of the annular, recess $j$, and slots $i$, in combination with spokes S, provided with head $n$, and collar $a$, substantially as and for the purpose set forth.

4. In a metallic wheel, the annular A', provided with a rim on both its ends, the inside of the said rim projecting beyond the outside, and the rim slotted, as shown, in combination with spokes provided with heads, the said heads seated in the annular, collars embracing and supporting the body of the said spokes, and with pipe-box centrally secured in the annular and collars, all substantially as and for the purpose set forth.

5. In a metallic hub, the collar $a$, provided with the recess $r$ and slots $i'$, in combination with annular A', provided with rim $f$, and the rim $f$ projecting into the recess $r$ in the collar, substantially as and for the purpose set forth.

6. In a metallic hub, the collar $a$, provided with the recess $r$, slots $i'$, and inclined seat $k$, substantially as and for the purpose set forth.

7. The combination of the pipe-box B, provided with an inclined shoulder, $b$, and nut C, provided with the inclined annulet shoulder $b'$, and collars $a$, provided with inclined seat $k$, the inclined shoulders of the pipe-box and nut seated in the inclined seat in the collars, as shown.

8. The nut C, with sand-cap $l$, and ratchet R, made solid in one piece, in combination with pipe-box B, substantially as and for the purpose set forth.

9. In a metallic hub, the annular A', provided with the rim, slots, and recess formed on both its ends, in combination with collars covering both ends of the annular, and the collars provided with slots $i'$, recess $r$, and inclined seat $k$, and with the pipe-box and nut C, substantially as and for the purpose set forth.

JOHN LANE.

Witnesses:
JOSEPH N. BARKER,
E. J. LANE.